United States Patent [19]

Ishida

[11] Patent Number: 5,251,166

[45] Date of Patent: Oct. 5, 1993

[54] REDUNDANT BINARY TYPE DIGITAL OPERATION UNIT

[75] Inventor: Ryuji Ishida, Tokyo, Japan

[73] Assignee: NEC Corporation, Tokyo, Japan

[21] Appl. No.: 864,599

[22] Filed: Apr. 7, 1992

[30] Foreign Application Priority Data

Apr. 8, 1991 [JP] Japan .................................... 3-73521

[51] Int. Cl.$^5$ ........................ G06F 7/38; G06F 11/00
[52] U.S. Cl. ................................. 364/746.2; 364/745; 364/737
[58] Field of Search ................. 364/746.2, 736, 736.5, 364/737, 738, 750.5, 754, 745

[56] References Cited

U.S. PATENT DOCUMENTS

| | | | |
|---|---|---|---|
| 4,722,066 | 1/1988 | Armer et al. | 364/737 |
| 4,945,507 | 7/1990 | Ishida et al. | 364/737 |
| 4,985,861 | 1/1991 | Yamashina et al. | 364/746.2 |
| 5,144,576 | 9/1992 | Briggs et al. | 364/754 |

*Primary Examiner*—Jerry Smith
*Assistant Examiner*—C. Ngo
*Attorney, Agent, or Firm*—Whitham & Marhoefer

[57] ABSTRACT

This redundant binary type digital operation unit is provided with a redundant binary adder which gives a plurality of carry margin digits to the word length of the input redundant binary data on the higher digit side and further gives a protection digit for overflow judgment at the highest position to form the entire operation word length. It is also provided with a fixed value data output circuit to which a carry signal from the redundant binary adder showing whether a carry exists or not is input and which outputs the maximum value data when the carry signal value is "1" and the minimum value data when the carry signal value is a value other then "1", as well as a selection circuit which selects and outputs the output data from the redundant binary adder when the sign bit of the protection digit at the highest position sent from the redundant binary adder is "0", and the maximum or minimum value data from the fixed value data output circuit when the sign bit is "1".

5 Claims, 3 Drawing Sheets

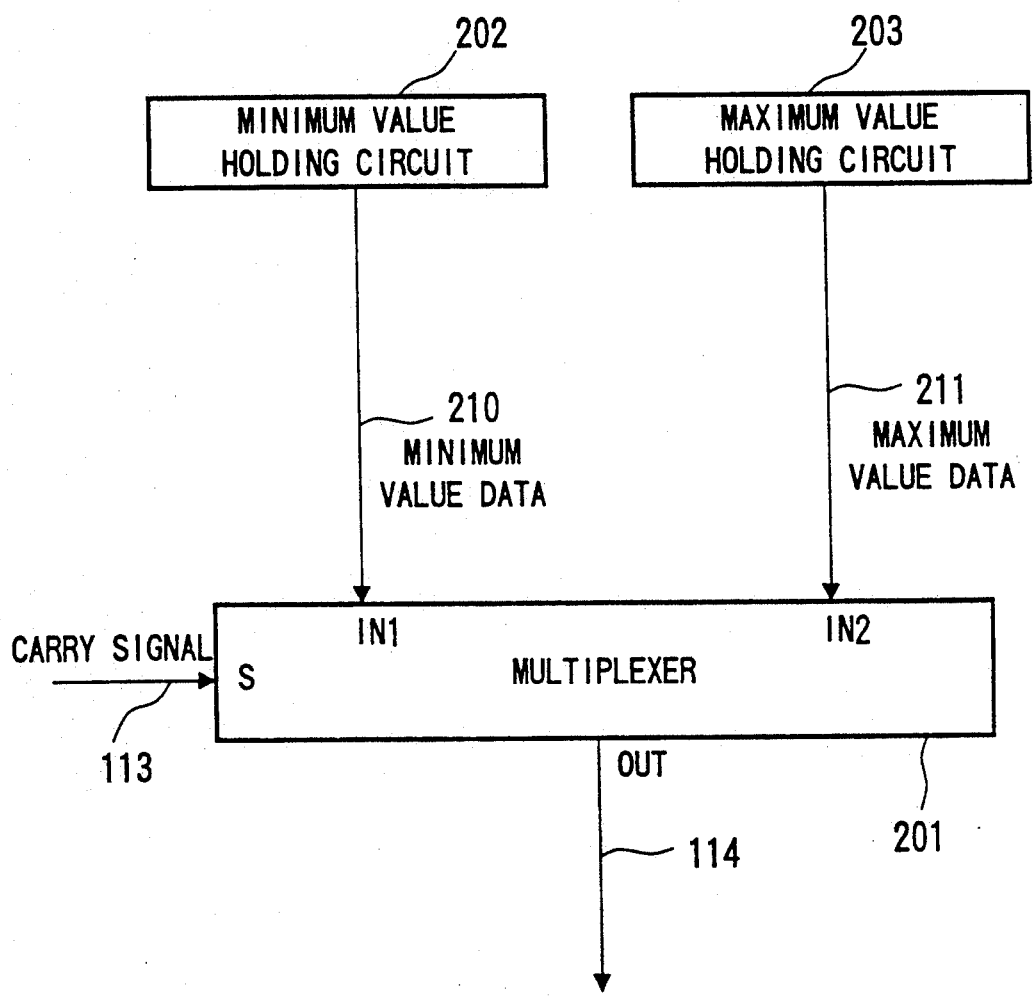

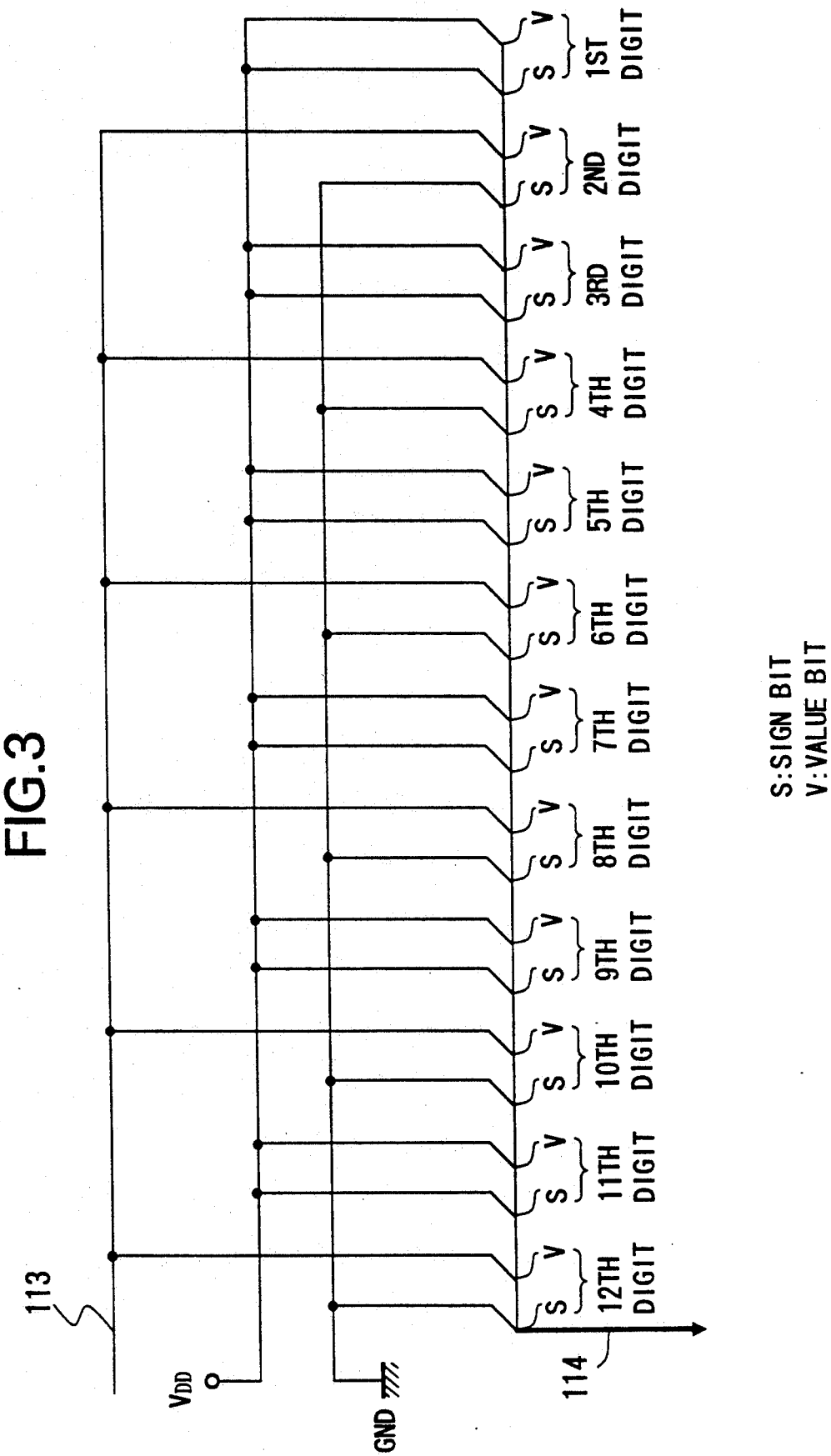

REDUNDANT BINARY TYPE DIGITAL OPERATION UNIT

BACKGROUND OF THE INVENTION

1. Field of the Invention

The present invention relates to a digital operation unit, and particularly relates to a redundant binary type digital operation unit which processes operation using redundant binary notation.

2. Description of the Prior Art

Conventionally, a redundant binary type digital operation unit of this kind have judged whether an operation data is overflowing or not by either of the following two methods. The first one detects an overflow by, after converting the operation data into binary numbers, giving the sign contrary to that of the redundant binary data to the binary data. The second one judges the data overflowing when a carry from the redundant binary operation circuit occurs, reasoning from degraded integrity of redundant binary data.

The redundant binary number here means a method of is expressed by three values "1", "0", and "−1". This can eliminate the propagation of carries in operation, which results in a fixed operation time regardless of the operation word length. The three values of a redundant binary number are respectively given in two bits: 01 (=1), 00 (=0), and 11 (=−1). Since each digit may be "1", "0" or "−1" ("−1" is hereinafter referred to as "T" for convenience), the maximum value of an eight-digit number, for example, is "11111111" (=255), and the minimum value in this case is "TTTTTTTT" (=−255). This way of expression can cover a wider data range with the same word length than ordinary binary notation. In particular, fixed operation speed regardless of operation word length enables a high-speed operation circuit for operations where data are accumulated such as filter operation. Specifically, time-consuming process of conversion from redundant binary numbers to binary numbers is arranged like pipelines so that the redundant binary data are accumulated at a high speed and then the results are converted from a redundant binary number to a binary number.

The redundant binary operation method is to prevent a carry from being propagated. With this method, when summing two data, the values at the digits immediately below the one to be calculated are first referred to so as to generate an intermediate carry and sum, which are used for processing a carry from the lower digit.

For example, if the digit n ("n"th digit) of the augend data is "1" and the digit n of the addend data is "0", a carry from a lower digit causes further carries to the digits higher than the digit n, resulting in carry propagation. To avoid this, the status at the digit immediately below the digit n is checked first and, if there's a possibility of a carry, a carry of "1" is given to the digit n+1 in advance with keeping an intermediate sum of "T". This can stop the propagation of a carry by operation "1+T=0" even if a carry occurs from the lower digit. Table 1 shows the operation rule in the first step of the redundant binary addition. In this table, the augend at digit n is expressed as Xn, the addend at digit n is Yn, the values at the digits immediately below digit n for augend and addend Xn−1 and Yn−1 respectively, the carry Ci and the intermediate sum Si.

TABLE 1

| (XN) | (YN) | (Xn−1, Yn−1) | (Ci) | (Si) |
|---|---|---|---|---|
| 1 | 1 |  | 1 | 0 |
| 1 | 0 | Both are positive | 1 | T |
| 0 | 1 | Either is negative at least | 0 | 1 |
| 0 | 0 |  |  |  |
| 1 | T |  | 0 | 0 |
| T | 1 |  |  |  |
| 0 | T | Both are positive | 0 | T |
| T | 0 | Either is negative at least | T | 1 |
| T | T |  | T | 0 |

Suppose a binary number expressed as an eight-bit data "01100000" (=96) now. Since a binary number can be converted into a redundant binary number just by reversing the sign at the sign bit, the above value is "01100000" in redundant binary notation, too. If "0" is added according to the rule shown in Table 1, the operation result will be:

```
   0 1 1 0 0 0 0 0
+) 0 0 0 0 0 0 0 0
   1 0 T 0 0 0 0 0
+) 0 0 0 0 0 0 0 0
(1)T 0 T 0 0 0 0 0
``` where (1) means an overflow.

Thus, even a value which can be expressed in binary notation can, if expressed in redundant binary notation, can cause an overflow when "0" is added to the value, and the data cannot be held.

Such a conventional redundant binary operation circuit always detects an overflow by converting the operation data into binary numbers. For example, accumulation can be processed at a higher speed by using the redundant binary operation method, but the accumulation results have to be converted into binary numbers for overflow judgment when there's a possibility of overflow. This results in a reduced speed of operation.

Another drawback of the conventional method is that a carry signal can be generated even when overflow does not occur actually, since the values of redundant binary notation are expressed with three values "1", "0" and "−1", and the same value can be expressed in various ways. For example, the value "5" in decimal notation is "0101" in binary notation, and in redundant binary notation, this value may be a four-digit number "1T1T" or five-digit number "1TOTT". When the decimal number "5" is expressed in the redundant binary notation as a five-digit number "1TOTT", a carry signal occurs if the operation circuit is made for the operation word length of four digits. In this case, the value is judged overflow, though the actual value does not overflow. In addition, a conventional redundant binary operation circuit judges the status of the digit immediately below the one to be processed. This means that, among the values causing a carry signal with operation output, negative values have larger absolute values than positive ones, resulting in deviation between positive and negative values. Specifically, when supposing two values "+8" and "−8" expressed in four digits, "+8" is expressed as "1000" in redundant binary notation and "−8" as "TOOO". For example, if O is added to both numbers, an overflow occurs only when the number is positive as shown below.

```
  1 0 0 0        T 0 0 0
+) 0 0 0 0     +) 0 0 0 0
─────────      ─────────
(1) T 0 0 0       T 0 0 0
 overflow
```

SUMMARY OF THE INVENTION

An object of the present invention is to provide a redundant binary type digital operation unit capable of high speed accumulation processing without the drawback of hampered processing time due to operation for overflow judgment.

Another object of this invention is to provide a redundant binary type digital operation unit which can prevent a data which is not overflowing from being judged overflowing and solve the deviation between positive and negative values in overflow judgment.

Still another object of this invention is to provide a redundant binary type digital operation unit which automatically corrects an overflow so as to eliminate the need of specialized data operation for overflow correction, resulting in simpler operation control.

According to an embodiment of the present invention to attain these objects, a redundant binary type digital operation unit comprises redundant binary adder means whose operation word length is determined by adding a plurality of carry margin digits on the higher value side and one protection digit for overflow judgment at the highest position to the word length of the redundant binary data input, fixed value data output means to which a carry signal showing the value of carry output from the redundant binary adder means is input and which outputs either of predetermined fixed value data depending on the value of the carry signal and selection means which selectively outputs the data output from the redundant binary adder means or the fixed data from the fixed value data output means depending on the selection signal from the redundant binary adder means.

According to another preferred embodiment, the selection means inputs the value of the protection digit at the highest position of the data output from the redundant binary adder means as the selection signal and selects and outputs a fixed data from the fixed data output means when the value of the protection digit of the output data is "−1", or the data output from the redundant binary adder means when the protection digit of the output data has a value other than "−1".

According to a further preferred embodiment, the fixed value output means outputs a fixed value data depending on the carry signal output from the redundant binary adder means to show whether a carry exists or not. Specifically, it outputs, as the fixed value data, the maximum redundant binary data which has the same word length for data as the unit has for operation and which does not overflow even if "0" is added when the carry is "1", and the minimum redundant binary data having the sign bit contrary to the maximum fixed value data when the carry is a value other than "1".

According to still another embodiment, the fixed value output means comprises maximum value holding means to hold the maximum redundant binary data, minimum value holding means to hold the minimum redundant binary data and switching means which, according to the carry signal showing the value of carry output from the redundant binary adder means, selects and outputs the maximum or minimum redundant binary data from the maximum value holding means or minimum value holding means. Alternatively the fixed value output means outputs data with the redundant binary value bits at the even numbered digits connected with the carry signal from the redundant binary adder means, the sign bits at the even numbered digits connected with low level potential, and the value and sign bits at odd numbered digits connected with high level potential, so as to selectively outputs the maximum and minimum redundant binary data considering the carry signal of the redundant binary adder means to be at high level when the carry is "1" and at low level when the carry is a value other than "1".

Other objects and effects of the present invention will be clarified by the detailed description below.

BRIEF DESCRIPTION OF THE DRAWINGS

FIG. 2 is a block diagram to illustrate the configuration of a fixed value output circuit incorporated in a redundant binary type digital operation unit of the present invention according to a first embodiment.

FIG. 3 is a block diagram to illustrate the configuration of a fixed value output circuit incorporated in a redundant binary type digital operation unit of the present invention according to a second embodiment.

DESCRIPTION OF THE PREFERRED EMBODIMENT

Figure 1:
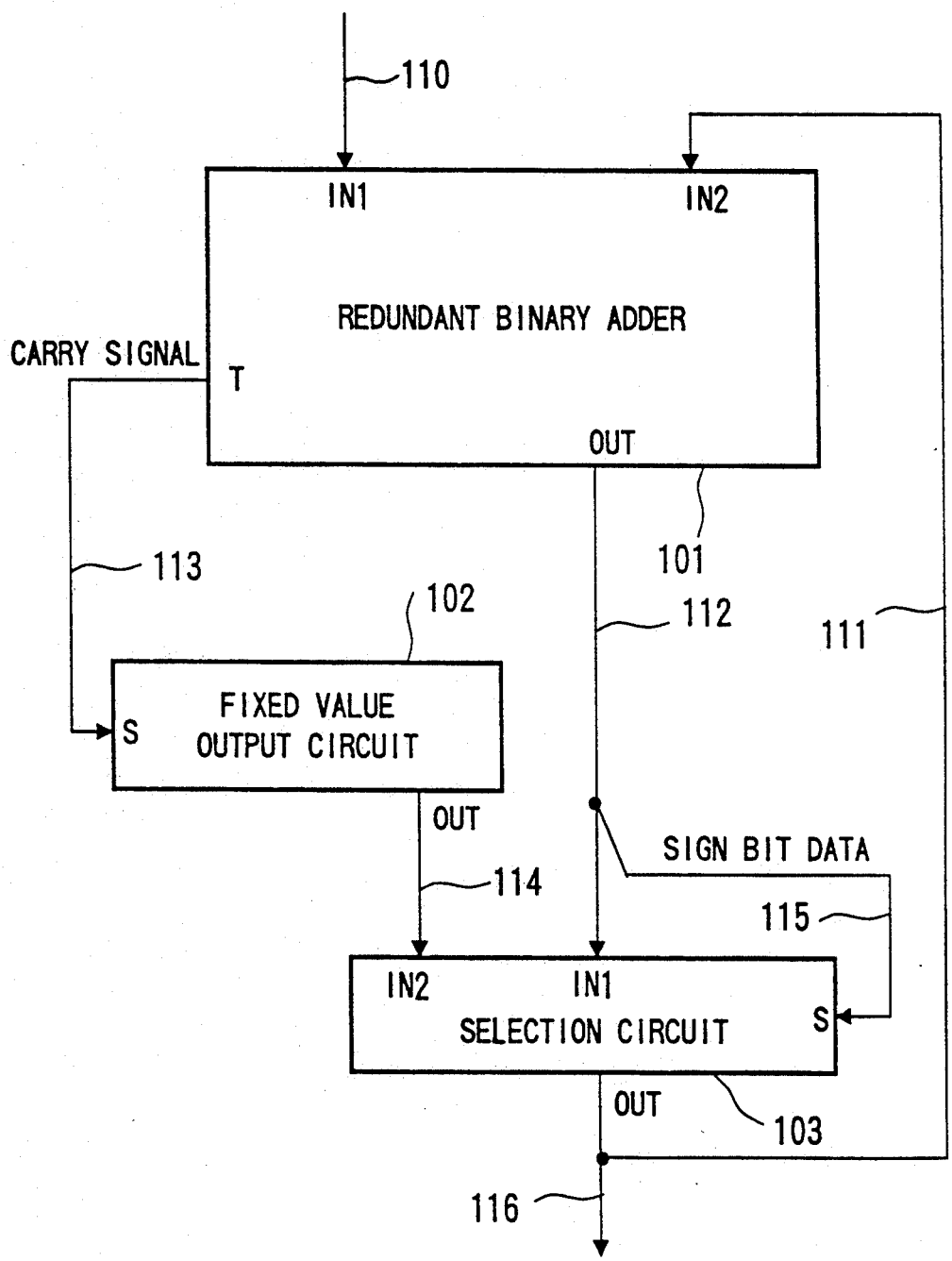
FIG. 1 is a block diagram to illustrate the configuration of a redundant binary type digital operation unit according to an embodiment of the present invention.

Referring to FIGS. 1 to 3, preferred embodiments of this invention are described below. FIG. 1 gives a block diagram showing the configuration of a redundant binary type digital operation unit according to an embodiment of this invention.

The redundant binary notation type digital operation unit of FIG. 1 comprises a redundant binary adder 101 for addition processing of redundant binary data, a fixed value output circuit 102 which selectively outputs different fixed values upon receiving a carry signal from the redundant binary adder 101 and a selection circuit 103 which selectively inputs either of the output from the redundant binary adder 101 or that from the fixed value output circuit 102 depending on the sign bit content of the operation data output from the redundant binary adder 101 so as to output the operation results.

Input data is input to a first input terminal IN1 of the redundant binary adder 101 via a data line 110. Operation data output from the output terminal OUT of the redundant binary adder 101 is input to the first input terminal IN1 of the selection circuit 103 via a data line 112. The sign bit at the highest digit among the operation data output from the redundant binary adder 101 is input to the selection signal input terminal S of the selection circuit 103 via a data line 115. Carry signal output from a carry signal output terminal T of the redundant binary adder 101 is input to the selection signal input terminal S of the fixed value output circuit 102 via a data line 113.

Output data from the output terminal OUT of the fixed value output circuit 102 is input to a second input terminal IN2 of the selection circuit 103 via a data line 114. Output data from the output terminal OUT of the selection circuit 103 is output via a data line 116 and at the same time, input to the second input terminal IN2 of the redundant binary adder 101 via a data line 111 for accumulation.

In this embodiment, the word length for data input via a data line 110 is set to eight digits. The redundant binary adder 101 has the operation word length of 12 digits by providing three marginal digits for a carry on the higher digit side and further adding a protection digit for overflow judgment as the highest digit to the eight-digit word length of the input data. After all, the data converted as binary data has the word length of 11 digits excepting the above protecting digit. Eight-digit data input to the first input terminal IN1 of the redundant binary adder 101 is given to the lower eight digits of the 12-digit long operation word. For each of the highest four digits of the operation word length, "0" is input.

Next, FIG. 2 is a configuration diagram of the fixed value output circuit 102. The fixed value output circuit 102 comprises a minimum value holding circuit 202, a maximum value holding circuit 203 and a multiplexer 201. The fixed data output from the minimum value holding circuit 202 is input to the second input terminal IN2 of the multiplexer 201 via a data line 210, and the fixed data output from the maximum value holding circuit 203 is input to the first input terminal IN1 of the multiplexer 201 via a data line 211. The carry signal from the carry signal output terminal T of the redundant binary adder 101 is input to the selection signal input terminal S of the multiplexer 201 via a data line 113. The multiplexer 201 selects and outputs the fixed data from the maximum value holding circuit 203 or the minimum value holding circuit 202 to the selection circuit 103 via the data line 114 depending on the status of the carry signal.

The maximum value which does not cause an overflow even when "0" is added among 12-digit redundant binary numbers is "1T1T1T1T1T1T". This value "1T1T1T1T1T1T" is held by the maximum value holding circuit 203. The value obtained by reversing the sign condition of the maximum value is the minimum value "0T0T0T0T0T0T", which is held by the minimum value holding circuit 202.

The operations of the fixed value output circuit 102 and the selection circuit 103 are now described. When the protection digit at the highest place of the output data output from the redundant binary adder 101 is "T", i.e. the sign bit data for the highest digit output via the data line 115 is "1", their operation is judged overflow and the selection circuit 103 selects and outputs the data input from the fixed value output circuit 102 to the second input terminal IN2. When the sign bit data at the highest place is "0", the selection circuit 103 selects and outputs the data input from the redundant binary adder 101 to the second input terminal IN2. In other words, the selection circuit 103 outputs the maximum or minimum value input from the fixed value output circuit 102 judging that an overflow occurs when the protection digit at the highest place of the output data is "T".

When the carry signal input from the redundant binary adder 101 to the selection signal input terminal S is "1", the fixed value output circuit 102 selects and outputs the maximum value data "1T1T1T1T1T1T" held by the maximum value holding circuit 203 mentioned above through operation of the multiplexer 201. When the carry signal is a value other than "1", it selects and outputs the minimum value data "0T0T0T0T0T0T" held by the minimum value holding circuit 202.

For convenience, the following description covers only the highest five digits out of the 12 digit long operation word. The five digits consists of the highest digit, the three digits for carry margin and the protection digit for carry of a redundant binary number. Table 2 shows the data change when "1" is continuously added and when "T" is continuity added.

TABLE 2

| | | | | | | | | | | | |
|---|---|---|---|---|---|---|---|---|---|---|---|
| [0] | 0 | 0 | 0 | 0 | 0 | [0] | 0 | 0 | 0 | 0 | 0 |
| +1 | | | | | 1 | −1 | | | | | T |
| [1] | 0 | 0 | 0 | 1 | T | [−1] | 0 | 0 | 0 | 0 | T |
| +1 | | | | | 1 | −1 | | | | | T |
| +0 | 0 | 0 | 0 | 1 | 0 | [−2] | 0 | 0 | 0 | T | 0 |
| [2] | 0 | 0 | 1 | T | 0 | −1 | | | | | T |
| +1 | | | | | 1 | [−3] | 0 | 0 | T | 1 | T |
| +0 | 0 | 0 | 1 | 0 | T | −1 | | | | | T |
| [3] | 0 | 1 | T | 0 | T | [−4] | 0 | 0 | T | 0 | 0 |
| +1 | | | | | 1 | −1 | | | | | T |
| [4] | 0 | 1 | T | 0 | 0 | [−5] | 0 | 0 | T | 0 | T |
| +1 | | | | | 1 | −1 | | | | | T |
| [5] | 0 | 1 | T | 1 | T | +0 | 0 | 0 | T | T | 0 |
| +1 | | | | | 1 | [−6] | 0 | T | 1 | T | 0 |
| +0 | 0 | 1 | T | 1 | 0 | −1 | | | | | T |
| +0 | 0 | 1 | 0 | T | 0 | [−7] | 0 | T | 0 | 1 | T |
| [6] | 1 | T | 0 | T | 0 | −1 | | | | | T |
| +1 | | | | | 1 | [−8] | 0 | T | 0 | 0 | 0 |
| | | | | | | −1 | | | | | T |
| [7] | 1 | T | 0 | 0 | T | [−9] | 0 | T | 0 | 0 | T |
| +1 | | | | | 1 | −1 | | | | | T |
| [8] | 1 | T | 0 | 0 | 0 | [−10] | 0 | T | 0 | T | 0 |
| +1 | | | | | 1 | −1 | | | | | T |
| [9] | 1 | T | 0 | 1 | T | +0 | 0 | T | T | 1 | T |
| +1 | | | | | 1 | [−11](0) | T | 1 | T | 1 | T |
| +0 | 1 | T | 0 | 1 | 0 | where (0) means carry | | | | | |
| [10] | 1 | T | 1 | T | 0 | | | | | | |
| +1 | | | | | 1 | | | | | | |
| +0 | 1 | T | 1 | 0 | T | | | | | | |
| +0 | 1 | 0 | T | 0 | T | | | | | | |
| [11](1) | T | 0 | T | 0 | T | | | | | | |
| where (1) means carry | | | | | | | | | | | |

As shown in Table 2 above, addition of "0" causes the data increased by increments of "1" to have "T" at the highest digit, from +11 for positive values and −11 for negative values. The maximum value which does not cause an overflow is ±10 for both positive and negative values. For +11 or −11, "T" appears at the highest digit and the value is judged overflow, and the maximum and minimum value data are output from the selection circuit 103. Thus, in this embodiment, overflow judgment is performed according to the value at the highest digit, and if a value is judged overflowing, the maximum or minimum value data is output for automatic correction of the overflow. This eliminates the need of data operation for overflow correction. In addition, a protection digit at the highest position for overflow judgment using the value of this digit contributes to a higher accumulation speed. Unlike the accumulation operation accompanied by overflow judgment with converting output redundant binary data into binary data, high accumulation speed is not hampered by overflow judgment with conversion from redundant binary to binary data. The protection digit provided at the highest position prevents the data which is not overflowing from being judged overflowing. Since a value is judged overflowing when the protection digit at the highest position is "T", deviation between positive and negative values in overflow judgment is solved.

Redundant binary operation results finally output from the selection circuit 103 are converted into binary notation for later processing. In the above example shown in Table 2, since there are three carry margin digits, values up to ±8 can be expressed as binary numbers. This ensures the operation accuracy for redundant binary numbers and the sign information can be held even when the value is converted into a binary number.

Data from 8 to 10 and the output data from −8 to −10 can be judged by reversing the sign bit during conversion from a redundant binary to binary number. By replacing the maximum value data for the data from 8 to 10 and the minimum value data for the data from −8 to −10, conversion into binary notation can be achieved.

Next, referring to FIG. 3, a second embodiment of the fixed value output circuit 102 is described below. In the second embodiment, out of the 12 digits of the data output from the fixed value output circuit 102, the second, fourth, sixth, eighth, tenth and twelfth digit data from the lowest have their value bits V connected with the data line 113 for carry signal from the redundant binary adder 101. The value and sign bits at the first, third, fifth, seventh, ninth and eleventh digits are connected with a high-level controlled potential $V_{DD}$. To the sign bits of the data at the second, fourth, sixth, eighth, tenth and twelfth digits, low level grounding potential GND is connected.

The carry signal from the redundant binary adder 101 output via the data line 113 shows high level when the carry is "1" and low level when carry is not caused.

Among the 12 digits of data output from the fixed value output circuit 102, the output data at the first, third, fifth, seventh, ninth and eleventh digits from the lowest show redundant binary "11", i.e. "T", because both value and sign bits are connected with the high level controlled potential Vdd. The output data from the second, fourth, sixth, eighth and twelfth digits depend on the value shown by the data line 113, and gives "01", which means "1", when the carry signal is at high level, and "00", which means "0", when it is at low level.

Specifically, when the carry signal value from the data line 113 is at high level, which means that the carry is "1", the output from the fixed value output circuit 301 is the maximum value "1T1T1T1T1T1T", and when the carry signal value from the data line 113 is at low level, i.e. a value other than "1", the output from the fixed value output circuit 301 is the minimum value "0T0T0T0T0T0T". Therefore, this embodiment realizes the same operation as the fixed value output circuit 102 shown in FIG. 2. This mechanism uses positive logic.

The redundant binary type digital operation unit according to this invention can be applied, for example, to a digital filter of a digital-to-analog (D/A) converter incorporated in audio equipment such as a compact disc player and an audio amplifier.

Obviously, various modifications can be made to the above embodiment. It is intended to cover in the appended claims all such modifications as fall within the true spirit and scope of the invention.

What is claimed is:

1. A redundant binary type digital operation unit comprising:
   redundant binary adder means having first and second input terminals, a data output terminal and a carry output terminal, said first input terminal receiving a redundant binary data input and said second input terminal receiving an accumulation data input, said redundant binary adder means providing an operation word on said output terminal, said operation word having a word length determined by providing a plurality of carry margin digits on a higher value side of the word and one protection digit for overflow judgment at a highest position to the word length of the redundant binary data input;
   fixed value data output means to which a carry signal representing a value of a carry output from said carry output terminal of said redundant binary adder means is input and which outputs one of first and second predetermined fixed value data depending on the value of said carry signal; and
   selection means which selectively outputs the operation word from said data output terminal from said redundant binary adder means or the fixed value data from said fixed value data output means depending on the protection digit as a selection signal from said redundant binary adder means.

2. A redundant binary digital operation unit of claim 1 wherein said selection means receives the value of the protection digit at the highest position of the data output from the redundant binary adder means as the selection signal and selects and outputs a fixed data from said fixed data output means when the value of the protection digit of the output data is "−1", or the data output from said redundant binary adder means when the protection digit of the output data has a value other than "−1".

3. A redundant binary type digital operation unit of claim 1 wherein said fixed value output means outputs as the first fixed value data a maximum redundant binary data which has the same word length for data as the unit has for operation and which does not overflow even if "0" is added when the carry is "1", and outputs as the second fixed value data a minimum redundant binary data having the sign bit contrary to said maximum fixed value data when the carry is a value other than "1".

4. A redundant binary type digital operation unit of claim 3 wherein said fixed value output means comprises maximum value holding means to hold the maximum redundant binary data;
   minimum value holding means to hold the minimum redundant binary data and
   switching means which, according to the carry signal representing the value of carry output from said redundant binary adder means, selects and outputs the maximum or minimum redundant binary data from said maximum value holding means or minimum value holding means.

5. A redundant binary type digital operation unit of claim 3 wherein said fixed value output means outputs data having the redundant binary value bits at the even numbered digits connected with the carry signal from said redundant binary adder means, the sign bits at the even numbered digits connected with low level potential, and the value and sign bits at odd numbered digits connected with high level potential, so as to selectively outputs the maximum and minimum redundant binary data according to said carry signal of said redundant binary adder means considered to be at high level when the carry is "1" and at low level when the carry is a value other than "1".

* * * * *